United States Patent
Ren et al.

(10) Patent No.: US 7,286,484 B2
(45) Date of Patent: Oct. 23, 2007

(54) Q-LEARNING-BASED MULTI-RATE TRANSMISSION CONTROL (MRTC) SCHEME FOR RRC IN WCDMA SYSTEMS

(75) Inventors: Fang-Chin Ren, Taoyuan (TW); Chung-Ju Chang, Taoyuan (TW); Yih-Shen Chen, Taoyuan (TW); Jian-An Chen, Taoyuan (TW)

(73) Assignee: Chunghwa Telecom Co., Ltd., Taoyuan (TW)

( * ) Notice: Subject to any disclaimer, the term of this patent is extended or adjusted under 35 U.S.C. 154(b) by 1189 days.

(21) Appl. No.: 10/339,600

(22) Filed: Jan. 10, 2003

(65) Prior Publication Data

US 2004/0136321 A1    Jul. 15, 2004

(51) Int. Cl.
  *H04J 1/16*    (2006.01)
  *H04B 7/216*   (2006.01)
  *G06F 15/18*   (2006.01)

(52) U.S. Cl. .................. 370/252; 370/335; 706/14
(58) Field of Classification Search ............ None
  See application file for complete search history.

(56) References Cited

U.S. PATENT DOCUMENTS

| | | | |
|---|---|---|---|
| 6,192,354 B1 * | 2/2001 | Bigus et al. ............. | 706/46 |
| 6,633,858 B2 * | 10/2003 | Yamakawa et al. ........ | 706/16 |
| 6,665,651 B2 * | 12/2003 | Young et al. ............ | 706/21 |
| 6,917,925 B2 * | 7/2005 | Berenji et al. .......... | 706/10 |
| 2003/0224813 A1 * | 12/2003 | Lehtinen et al. ....... | 455/513 |
| 2005/0058154 A1 * | 3/2005 | Lee et al. ............. | 370/473 |

OTHER PUBLICATIONS

S. Choi et al, "An uplink CDMA system architecture with diverse QoS guarantees for heterogeneous traffic," IEEE/ACM Trans. Netorking, vol. 7, No. 5, pp. 616-628, Oct. 1999.
K.S. Gilhousen, et al., "On the capacity of a cellular CDMA system," IEEE Trans. Veh. Technol., vol. 40, No. 2, pp. 303-312, May 1991.
W. Huang et al., "Performance evaluation of a DS-CDMA cellular system with voice and data services," IEEE PIMRC'96, pp. 588-592.
J. B. Kim et al, "Resource allocation for multiple classes of DS-CDMA traffic," IEEE Trans. Veh. Technol., vol. 49, No. 2, pp. 506-519, Mar. 2000.
S. M. Shin et al, "Interference-based channel assignment for DS-CDMA cellular systems," IEEE Trans. Veh. Technol., vol. 48, No. 1, pp. 233-239, Jan. 1999.

(Continued)

*Primary Examiner*—Andrew C. Lee
(74) *Attorney, Agent, or Firm*—Rabin & Berdo, P.C.

(57) ABSTRACT

The present invention provides a method using Q-learning rule to accurately estimate the transmission cost for the multi-rate transmission control (MRTC) for RRC (radio resource control) in the WCDMA network. This method comprises the following iterative steps: first obtaining a system state and an action using an incoming request, a mean of interference and a variance of interference, then obtaining Q values based on the system state and the action. Afterwards, allocating an optimal action with the Q values, and when a new request with a new state arrives, going back to the first step and updating the Q values using the new state and a cost function based on the system state and the action.

32 Claims, 4 Drawing Sheets

OTHER PUBLICATIONS

N. Dimitriou et al, "Quality of service for multimedia CDMA," IEEE Comm. Mag., vol. 38, No. 7, pp. 88-94, Jul. 2000.

D. Mitra, et al, "Robust dynamic admission control for unified cell and call QoS in statistical multiplexers," IEEE J. Select. Areas. Commun., vol. 16, No. 5, pp. 692-707, 1998.

K. W. Ross, "Multiservice Loss Models for Broadband Communication Networks. Berlin", Germany: Springer-Verlag, 1995.

J. Nie et al., "A Q-learning-based dynamci channel assignment technique for mobile Communication systems," IEEE Trans. Veh. Technol., vol. 48, No. 5, pp. 1676-1687, Sep. 1999.

H. Tong et al, "Admission call admission control under quality if service constraints: a reinforcement learning solution," IEEE Trans. Veh. Technol., vol. 18, No. 2, pp. 209-221, Feb. 2000.

B. Makarevitch, "Application of reinforcement learning to admission control in CDMA network," IEEE PIMRC 2000, pp. 1353-1357.

P. Marbach et al, "Call admission control and routing in integrated services networks using neuro-dynamic programming," IEEE Trans. Veh. Technol., vol. 18, No. 2, pp. 197-208, Feb. 2000.

C. J. C. H. Watkins et al, "Q-learning," Machine Learning, vol. 8, pp. 279-292, 1992.

S. Haykin, Neural Networks 2nd. Prentice Hall, 1999.

D. P. Bertsekas et al , "Neuro-Dynamic Programming". Athena Scientific, 1996.

3GPP TS25.211: "Physical Channels and Mapping of Transport Channels onto Physical Channels (FDD)," V3.1.1, Dec. 1999.

3GPP TS25.321: "MAC Protocol Specification," V3.2.0, Dec. 1999.

3GPP TS25.214: "Physical layer procedures (FDD)," v.4.0.0, Mar. 2001.

R. Bellman, Dynamic Programming, Princeton, NJ: Princeton Univ. Press, 1957.

* cited by examiner

Q-LEARNING-BASED MULTI-RATE TRANSMISSION CONTROL (MRTC) SCHEME FOR RRC IN WCDMA SYSTEMS

FIELD OF INVENTION

The present invention is related to communication systems, and more particularly, to the WCDMA system using Q-learning-based MRTC scheme.

BACKGROUND OF THE INVENTION

Wideband CDMA (WCDMA) is one of the promising radio access technologies for IMT-2000. The objective of a WCDMA system is to provide users a radio access link to services comparable to those currently offered by fixed networks, resulting in a seamless convergence of both fixed and mobile services. The WCDMA is designed to integrate different types of services, such as voice, data, image, and compressed video where heterogeneous QoS requirements, such as transmission rate, delay, and bit error rate for these differentiated services will be supported. Therefore, an adequate radio resource control (RRC) is required to enhance the spectrum utilization while meeting those heterogeneous QoS requirements.

The physical layer and the MAC specifications for WCDMA are defined by 3GPP [16]-[17]. The WCDMA has two types of uplink dedicated physical channels (DPCHs): the uplink dedicated physical data channel (DPDCH) and the uplink dedicated physical control channel (DPCCH). A DPDCH is used to carry data generated by layer 2 and above, and a DPCCH is used to carry layer 1 control information. Each connection is allocated a DPCH including one DPCCH and zero, one, or several DPDCHs. The channel is defined in a frame-based structure, where the frame length $T_f=10$ ms is divided into 15 slots with length $T_{slot}=2560$ chips, each slot corresponding to one power control period. Hence, the power control frequency is 1500 Hz. The spreading factor (SF) for DPDCH can vary between 4~256 by $SF=256/2^k$, $k=0, 1 \ldots 6$, carrying $10 \times 2^k$ bits per slot, and the SF for DPCCH is fixed at 256, carrying 10 bits per slot.

In addition, a common physical channel, named physical random access channel (PRACH), is defined to carry uplink random access burst(s). The PRACH carries random access bursts and short packets in the uplink. Based on a slotted ALOHA approach, a UE (user equipment) can start the transmission of a random access burst at a number of well-defined time-offsets, named access slots. There are 15 access slots per two frames and they are spaced 5120 chips apart. A random access burst contains a preamble part and a message part. The message part has a length of 10 ms and it is split into a data part and a control part similar to the uplink DPDCH and DPCCH, respectively. Note that SF of the data part is variable between $256/2^k$, $k=0,1,2,3$, and SF of the control part is fixed at 256.

Two types of WCDMA services are considered: real-time service as type-1 and non-real-time service as type-2. The WCDMA communication system provides connection-oriented transmission for real-time traffic and best-effort transmission rate allocation for non-real-time traffic, as the service discipline adopted in [1]. To guarantee the timely constraint of real-time service, a UE always holds a DPCH while it transmits real-time packets regardless of the variation of the required transmission rate. The real-time UE may generate variable rate information whose characteristics are indicated in its request profile. On the other hand, a UE should contend for the reservation of a DPCH to transmit a burst of non-real-time packets. And the UE will release the DPCH immediately after the burst of data is completely transmitted. The non-real-time data are transmitted burst by burst.

When a UE has data to transmit, it first sends its request embedded in a random access burst and transmitted via PRACH. After the base station receives the new request, the admissible transmission rate is evaluated. Due to the service requirements, the RRC performs two different kinds of decision. For a real-time request, the request will be accepted or rejected. On the other hand, for a non-real-time request, an appropriate transmission rate will be allocated. A non-real-time request specifies the range of the required transmission rates for itself, and would be blocked if the WCDMA system cannot provide a suitable transmission rate to satisfy its required transmission rate.

The transmission power of a physical channel should be adjusted according to its spreading factor, coding scheme, rate matching attributes, and BER requirement. It is assumed that all physical channels adopt the same coding scheme and have the same rate matching attributes and BER requirement. Therefore, power allocation for a physical channel is simply dependent of its spreading factor and in inverse proportion [18]. Since each UE determines its up-link transmission power in a distributed manner, the total received interference power at base station is time-varying. For operational stability, the transmission power is determined under the consideration of maximal allowed interference power. In this way, for WCDMA systems, the SIR-based power control scheme, which is specified by 3GPP, is equivalent to the strength-based power control scheme. The complexity of the multi-rate transmission control is reduced and operates regardless of the varying of the received interference.

The multi-rate transmission control in the WCDMA system is to assign it power and processing gain for different service requests so as to maximize the system capacity and to fulfill the users' satisfaction and QoS requirements. In [1], Choi and Shin proposed an uplink CDMA system architecture to provide diverse QoS for heterogeneous traffics: one is real-time (class-I) traffic and the other is non-real-time (class-II) traffic. They theoretically derived the admission region of real-time connections, transmission power allocation, and the optimum target signal-to-interference ratio of non-real-time traffic so as to maximize the system throughput and satisfy the predefined QoS of heterogeneous traffic.

There is no absolute number of maximum available channels in the WCDMA system because WCDMA system is interference-limited. Its capacity is affected by multiple access interference (MAI), which is a function of the number of active users, the users' location, the channel impairments, and heterogeneous QoS requirements. Many researches for CDMA capacity estimation are based on MAI and other considerations [2]-[4]. In [2], a single-service CDMA network with respect to MAI caused by users in the same and adjacent cells was studied. In [3], Huang and Baklawa investigated the uplink performance of a slotted direct sequence CDMA (DS-CDMA) system providing voice and data services. A log-normally distributed MAI model was proposed to estimate the remaining capacity in the CDMA system, where its mean and variance were given by a function of the number of users, and the mean and variance of each service type.

However, in multimedia mobile communication environments, the measured MAI value may not be stationary, and it is also affected by user locations and service profiles. In

[4], Kim and Honig studied the resource allocation for multiple classes of traffic in a single cell DS-CDMA system. A joint optimization was investigated over the power and the processing gain of the multiple classes to determine flexible resource allocation for each user subject to QoS constraints.

Shin, Cho and Sung proposed an interference-based channel assignment scheme for DS-CDMA cellular systems [5]. A channel is assigned if the interference is less than an allowed level, which is determined by the network, subject to the QoS constraints. Instead of a fixed system capacity, this interference-based scheme can adaptively assign a channel according to the actual system capacity such that the system utilization and the grade of service can be improved. The interference-based scheme was further extended to call admission control (CAC) in multimedia CDMA cellular systems [6]. A mathematical model was developed to determine the outage limits of a multiple-service CDMA system and to achieve the maximum aggregated capacity for different system parameters.

Maximizing system capacity (revenue) while meeting QoS constraints suggests a constrained semi-Markov decision process (SMDP) [7],[8]. The SMDP has successfully applied to many network control problems; however, it requires extremely large state space to model these problems exactly. Consequently, the numerical computation is intractable due to the sake of dimensionality. Also, a prior knowledge of state transition probabilities is required. Alternatively, many researchers turned to use the reinforcement learning (RL) algorithms to solve the large state space problems [9]-[12]. The most obvious advantage of RL algorithm is that it could obtain an optimal solution from the on-line operation if the RL algorithm is converged. Also, it does not require a prior knowledge of state transition probabilities.

REFERENCES

[1] S. Choi and K. G. Shin, "An uplink CDMA system architecture with diverse QoS guarantees for heterogeneous traffic," IEEE/ACM Trans. Netorking, vol. 7, no. 5, pp. 616-628, October 1999.
[2] K. S. Gilhousen, I. M. Jacobs, R. Padovani, A. J. Viterbi, L. A. Weaver, and C. E. Wheatley, "On the capacity of a cellular CDMA system," IEEE Trans. Veh. Technol., vol. 40, no. 2, pp. 303-312, May. 1991.
[3] W. Huang and V. K. Bhargava, "Performance evaluation of a DS-CDMA cellular system with voice and data services," IEEE PIMRC196, pp. 588-592.
[4] J. B. Kim and M. L. Honig, "Resource allocation for multiple classes of DS-CDMA traffic," IEEE Trans. Veh. Technol., vol. 49, no. 2, pp. 506-519, March 2000.
[5] S. M. Shin, C.-H. Cho, and D. K. Sung, "Interference-based channel assignment for DS-CDMA cellular systems," IEEE Trans. Veh. Technol., vol. 48, no. 1, pp. 233-239, January 1999.
[6] N. Dimitriou and R. Tafazolli, "Quality of service for multimedia CDMA," IEEE Comm. Mag., vol. 38, no. 7, pp. 88-94, July 2000.
[7] D. Mitra, M. I. Reiman, and J. Wang, "Robust dynamic admission control for unified cell and call QoS in statistical multiplexers," IEEE J. Select. Areas. Commun., vol. 16, no. 5, pp. 692-707, 1998.
[8] K. W. Ross, Multiservice Loss Models for Broadband Communication Networks. Berlin, Germany: Springer-Verlag, 1995.
[9] J. Nie and S. Haykin, "A Q-learning-based dynamci channel assignment technique for mobile Communication systems," IEEE Trans. Veh. Technol., vol. 48, no. 5, pp.1676-1687, September 1999.
[10] H. Tong and T. X. Brown, "Admission call admission control under quality if service constraints: a reinforcement learning solution," IEEE Trans. Veh. Technol., vol. 18, no. 2, pp. 209-221, February 2000.
[11] B. Makarevitch, "Application of reinforcement learning to admission control in CDMA network," IEEE PIMRC 2000, pp. 1353-1357.
[12] P. Marbach, O. Mihatsch, and J. N. Tsisiklis, "Call admission control and routing in integrated services networks using neuro-dynamic programming," IEEE Trans. Veh. Technol., vol. 18, no. 2, pp. 197-208, February 2000.
[13] C. J. C. H. Watkins and P. Dayan, "Q-learning," Machine Learning, vol. 8, pp. 279-292, 1992.
[14] S. Haykin, Neural Networks 2nd. Prentice Hall, 1999.
[15] D. P. Bertsekas and J. N. Tsitsiklis, Neuro-Dynamic Programming. Athena Scientific, 1996.
[16] 3GPP TS25.211: "Physical Channels and Mapping of Transport Channels onto Physical Channels (FDD)," V3.1.1, December 1999.
[17] 3GPP TS25.321: "MAC Protocol Specification," V3.2.0, December 1999.
[18] 3GPP TS25.214: "Physical layer procedures (FDD)," v.4.0.0, March 2001
[19] R. Bellman, Dynamic Programming, Princeton, N.J.: Princeton Univ. Press, 1957.

SUMMARY OF THE INVENTION

The present invention provides a method using Q-learning rule to accurately estimate the transmission cost for the multi-rate transmission control (MRTC) for RRC (radio resource control) in the WCDMA network. The MRTC is modeled as a total expected discount problem, and an evaluation function is defined to appraise the cumulative cost of the consecutive decisions for the Q-MRTC. Without knowing the state transition behavior, the evaluation function is calculated by a real-time RL technique known as Q-learning [13]. After a decision is made, the consequent cost is used as an error signal to feedback into the Q-MRTC to adjust the state-action pairs.

More particularly, this method comprises the following iterative steps: first obtaining a system state and an action using an incoming request, a mean of interference and a variance of interference, then obtaining Q values based on the system state and the action. Afterwards, allocating an optimal action with the Q values, and when a new request with a new state arrives, going back to the first step and updating the Q values using the new state and a cost function based on the system state and the action. Thus the learning procedure is performed in a closed-loop iteration manner, which will help the value of evaluation function converge for optimal radio resource control.

While in the Q values obtaining step, the Q-function approximation is the key issues in the implementation of Q-learning rule [14],[15]. In the proposed Q-MRTC, a feature extraction method and a radial basis function network (RBFN) are applied. With the feature extraction method, the state space of the Q-function is mapped into a more compact set. With the RBFN neural network, the storage memory requirement of the Q-function can be significantly reduced.

BRIEF DESCRIPTION OF THE DRAWINGS

The accompanying drawings, which are incorporated in and constitute a part of this specification, illustrate embodiment of the invention and, together with the description, serve to explain the objects, advantages, and principles of the invention.

In the drawings:

In FIG. 1:

Figure 2:
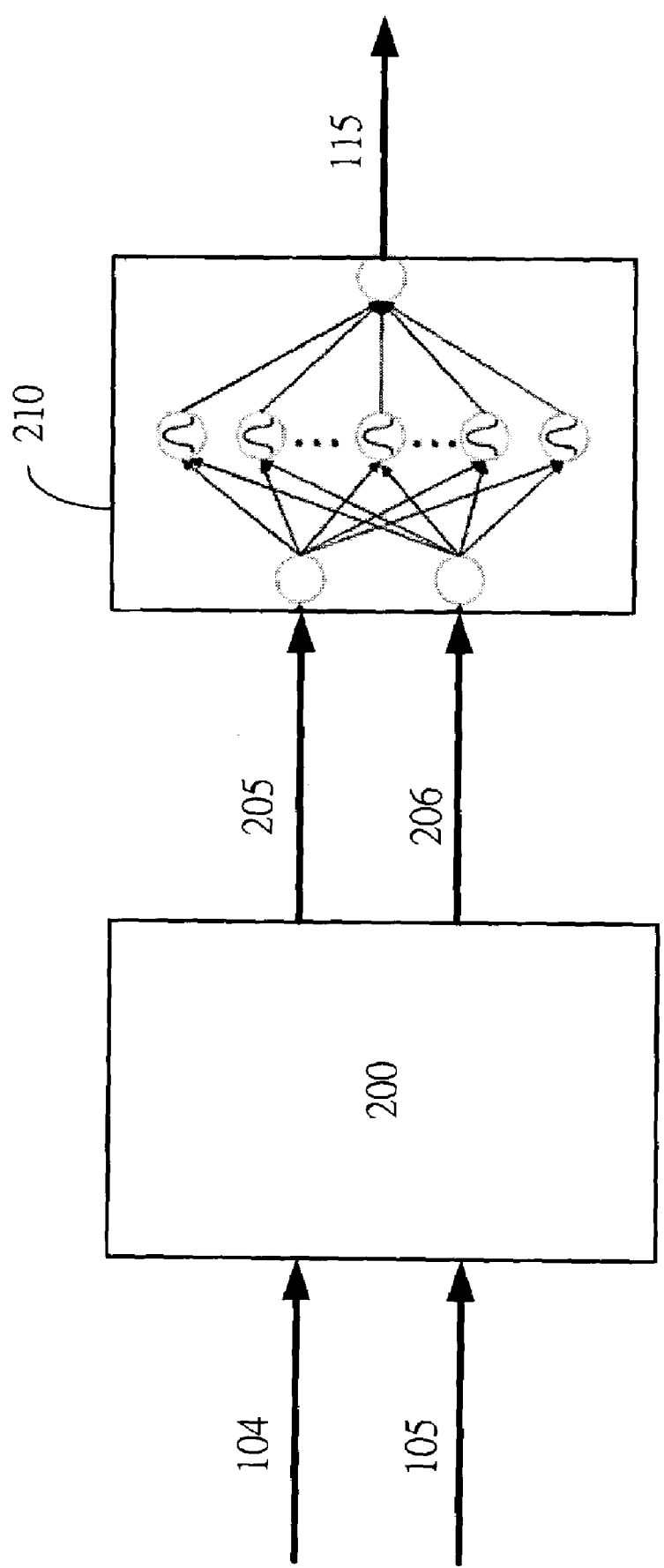
FIG. 2 shows the detailed implementation of Q-function computation circuit in FIG. 1.

100: state construction circuit; 101 incoming request; 102: mean of interference; 103: variance of interference; 104: system state; 105: action; 106: input of initial values of Q; 110:Q-function computation circuit; 115: Q values; 120:Q-learning rule circuit; 125: error signal; 130:rate allocation circuit; 135:optimal action;

In FIG. 2:

200: resultant interference profile circuit; 205: $(I_m+\Delta I_m)$; 206: $(I_v+\Delta I_v)$; 210:RBFN neural network;

DETAILED DESCRIPTION OF THE PREFERRED EMBODIMENTS

A. State, Action, and Cost Function

To describe the invention clearly, some descriptions are given first:

To maximize the system utilization, the radio resource control is designed to accommodate the access requests as many as possible and to allocate the transmission rate of each request as large as possible, meanwhile, the QoS requirements are fulfilled. Since there is no re-transmission for real-time packets, an error real-time packet will be dropped. The error non-real-time packets will be recovered via ARQ (automatic repeat request) scheme. In one aspect of the present invention, we assume that all packets have the same length. Also a data packet is transmitted in a DPDCH frame by a basic rate channel, therefore a multi-rate channel can transmit multiple data packets in a DPDCH frame.

A real-time request provides a mean rate and rate variance to indicate its transmission rate requirement, while a non-real-time request provides the maximum and minimum rate requirements. The mean and variance of the interference from the existing connections, denoted by $I_m$ and $I_v$, respectively, can be adopted to describe the interference profile of the system loading condition [3]. As noted, radio resource control of the WCDMA system can be regarded as a discrete-time SMDP problem, where major events in a cell are arrivals of heterogeneous requests.

Figure 1:
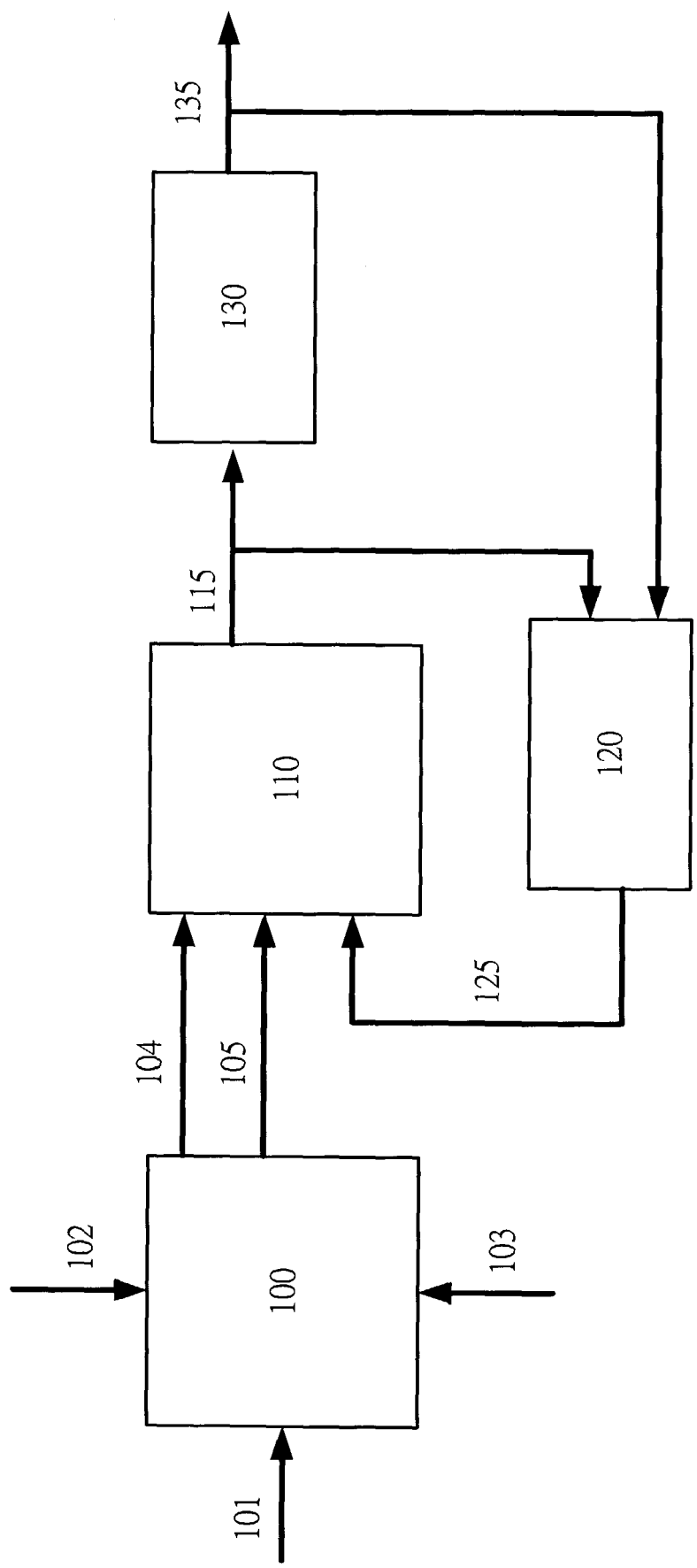
FIG. 1 shows the circuit of the Q-learning-based multi-rate transmission control scheme (Q-MRTC)

Please refer to FIG. 1, which illustrates a Q-learning-based multi-rate transmission control scheme (Q-MRTC) circuit for radio resource control in the WCDMA system.

The circuit comprises a state construction circuit 100, a Q-function computation circuit 110, a Q-learning rule circuit 120 and a rate allocation circuit 130.

In one exemplar aspect of the present invention, the state construction circuit 100 receives an incoming request 101 along with a mean of interference $I_m$ 102 and a variance of interference $I_v$ 103. The incoming request is treated as event that triggers the state construction circuit 100. For the arrival of the k-th incoming request, the system state x 104 of k-th request is defined as $X_k$:

$$x_k = (I_m, I_v, i, R_i) \quad \text{Eq. 1}$$

where $R_i$ is transmission rate requirement of the type-i request, i=1,2. The $R_1 = (r_m, r_v)$, where $r_m$ and $r_v$ denote the mean rate and the rate variance of a real-time request, respectively; the $R_2 = (r_{max}, r_{min})$, where $r_{max}$ and $r_{min}$ denote the maximum rate and the minimum rate requirements of a non-real-time request, respectively.

Based on the system state $x_k$, the state construction circuit 100 will determine an action A(x) 105, denoted by $A_k(X)$ for the k-th incoming request. The corresponding action is defined as:

Real-time request:

$$A_k(x) \in \begin{cases} 1, & \text{if accepted} \\ 0, & \text{if rejected.} \end{cases} \quad \text{Eq. 2}$$

Non-real-time request:

$$A_k(x) \in \begin{cases} r, r_{min} \leq r \leq r_{max}, & \text{if accepted} \\ 0, & \text{if rejected.} \end{cases} \quad \text{Eq. 3}$$

In one exemplar aspect of the present invention, the Q-function computation circuit 110 obtains Q values 115 based the system state x and the action A(x). At first, a cost function is defined as a linear combinations of various system performance measure terms. The general form of the cost function could be expressed as:

$$c(x_k, A_k) = \sum_{i=1}^{N} \gamma_i [M_i(x_k, A_k) - M_i^*]^2, \text{ where } \sum_{i=1}^{N} \gamma_i = 1 \quad \text{Eq. 4}$$

In Eq. 4, $M_i$ represents the i-th performance measure, $M_i^*$ is its corresponding QoS requirement, N is total number of measure terms, and $\gamma_i$ is a weighting factor. In one preferred embodiment of the present invention, packet error probability is used as the performance measurement. The cost function is given by:

$$c(x_k, A_k) = [P_E(x_k, A_k) - P_E^*]^2 \quad \text{Eq. 5}$$

where $P_E^*$ is the desired QoS requirement and $P_E(x_k, A_k)$ is measured performance of packet error probability if $x_k$ and $A_k$ being selected. The $c(x_k, A_k)$ is a random variable because channel fading and imperfect power control are not included in consideration yet. We further define an evaluation function, denoted by Q(x,A(x)), which is the total expected discounted cost counted having initial system state and action as x and A(x) over an infinite time. It is given by $$Q(x, A(x)) = E\left\{\sum_{k=0}^{\infty} \gamma^k c(x_k, A_k(x)) \bigg| x_0 = x, A_0(x) = A(x)\right\} \quad \text{Eq. 6}$$

where $0 \leq \gamma < 1$ is a discounted factor. The optimal multi-rate transmission control is to determine an optimal action, which minimizes the Q value with respective to the current state. The minimization of Q value represents the maximization of the system capacity while the QoS requirements are satisfied.

In one preferred embodiment of the present invention, let $P_{xy}(A(x))$ be the transition probability from state x with action A to the next system state y. Then Q(x,A(x)) can be expressed as $$Q(x, A(x)) = E\{c(x_0, A_0 | x_0 = x, A_0 = A(x)) + \quad \text{Eq. 7}$$

$$E\left\{\sum_{k=1}^{\infty} \gamma^k c(x_k, A_k(x)) \bigg| x_0 = x, A_0 = A\right\}$$

$$= E\{c(x, A(x))\} + \gamma \sum_y P_{xy}(A(x))E$$

$$\left\{\sum_{k=1}^{\infty} \gamma^{k-1} c(x_k, A_k(x)) \bigg| x_1 = y, A_1 = B\right\}$$

$$= C(x, A(x)) + \gamma \sum_y P_{xy}(A(x))Q(y, B(y))$$

where $C(x,A(x)) = E\{c(x,A(x))\}$. Eq.6 indicates that the Q function of the current state and action can be represented in terms of the cost function of the current state and action, along with the Q function of the next state and possible actions.

In one exemplar aspect of the present invention, the rate allocation circuit 130 allocates an optimal action A*(x) 135 based on the Q values 115. Based on the principle of Bellman's optimality [19], the optimal action, denoted by A*(x) 135, can be obtained by a two-step optimality operation. The first step is to find an intermediate minimal Q(x,A(x)), denoted by Q*(x,A(x)), where the intermediate evaluation function for every possible next state-action pair (y,B(y)) is minimized and the optimal action is performed with respective to each next system state y. Q*(x,A(x)) is given by $$Q^*(x, A(x)) = C(x, A(x)) + \quad \text{Eq. 8}$$

$$\gamma \sum_y P_{xy}(A(x)) \cdot \min_B \{Q^*(y, B(y))\}$$

for all $(x, A(x))$.

Then the optimal action A* (x) is determined with respective to the current state x under the condition that Q*(x,A(x)) is minimal, which can be expressed as $$Q^*(x, A^*(x)) = \min_{A(x)} [Q^*(x, A(x))] \quad \text{Eq. 9}$$

However, it is difficult to find the C(x,A(x)) and $P_{xy}(A(x))$ to solve. In one preferred embodiment of the present invention, based on the principle of Bellman's optimality [19], the optimal action, denoted by A*(x) 135, can be obtained by a two-step optimality operation. The first step is to find an intermediate minimal Q(x,A(x)), denoted by Q*(x,A(x)), where the intermediate evaluation function for every possible next state-action pair (y,B(y)) is minimized. Therefore, the present invention discloses the Q-learning rule to find the optimal resource allocation without a prior knowledge of C(x,A(x)) and $P_{xy}(A(x))$.

B. Implementation of Q-MRTC

Also refer to FIG. 1, in one exemplar aspect of the present invention, when a new incoming request with a system state y arrives, the Q-function computation circuit obtains the Q values based on the system state y and the action B(y), which is not shown in FIG. 1. The Q-learning rule circuit 120 updates the Q values 115 of system state x stored in the Q-learning circuit 120 by using state y and a cost function based on x 104 and A*(x) 135. From the above description, the Q-learning rule is used for finding optimal value Q*(x,A) in a recursive method using available information (x, A(x), y, c(x,A(x))), where x and y are the current and next states, respectively; A(x) and c(x,A(x)) are the action for current state and its cost function, respectively. Therefore, the Q-learning rule is formulated by $$Q(x, A(x)) = \begin{cases} Q(x, A(x)) + \eta \Delta Q(x, A(x)), & \text{if } (x, A(x)) \text{ is chosen} \\ Q(x, A(x)) & \text{otherwise.} \end{cases} \quad \text{Eq. 10}$$

where $\eta$ is the learning rate, $0 \leq \eta \leq 1$, and $$\Delta Q(x, A(x)) = \left\{c(x, A(x)) + \gamma \min_{B(y)}[Q(y, B(y))]\right\} - Q(x, A(x)) \quad \text{Eq. 11}$$

It has been shown in [13] that if the value of every system state and action pair is visited infinitely often and the learning rate is decreased to zero in a suitable way, then as the learning time goes to infinity, Q(x,A(x)) in Eq. 9 converges to Q*(x,A) with probability 1.

Please refer to FIG. 1 again. In one preferred embodiment of the present invention, the Q-function computation circuit 110 further comprises an input 106 for assigning a set of initial Q values. Before the Q-MRTC is performed for the online operation, it is necessary to assign properly a set of initial values. An appropriate initialization can provide a good relationship of the input parameters and the decision output for an event at the beginning of system operation such that the transient period of Q-learning procedure can be reduced. The initial Q values are obtained by considering the composite interference received at base station, which tend to be log-normally distributed. Although the assumption of log-normal distribution may not hold in some cases, it indeed provides a meaningful initial guess rather than random initialization.

For a given state-action pair (x,A(x)), the initial value of Q(x,A(x)) is set to be $(\overline{P}_E(x,A(x)) - P_E^*)^2$, where $\overline{P}_E(x, A(x))$ is the expected packet error probability if the system state and action (x,A(x)) is performed. The $\overline{P}_E(x, A(x))$ is given by $$\overline{P}_E(x,A(x)) = 1 - (1 - \int P_b(I)\Psi(I)dI)^L \quad \text{Eq. 12}$$

where $P_b(I)$ is the bit error probability at the interference level I.

$$P_b(I) = \kappa \exp{-\beta^* G/I} \quad \text{Eq. 13}$$

with parameters of $\kappa$ and $\beta$ which are adjustable for matching with a particular coding scheme, G is the spreading factor of a basic rate channel, and $\Psi(I)$ is the log-normal function for interference level I with mean $(I_m+\Delta I_m)$ and variance $(I_v+\Delta I_v)$.

C. Cost Function Approximation

Please refer to FIG. 2, which illustrates the detailed implementation of Q-function computation circuit 110. In one exemplar aspect of the present invention, the Q function computation circuit 110 comprises a resultant interference profile circuit 200 for obtaining x 104 and A(x) 105 as a function of $(I_m+\Delta I_m)$ 205 and $(I_v+\Delta I_v)$ 206; and a RBFN neural network 210 for performing back-propagation learning rule to the function of $(I_m+\Delta I_m)$ 205 and $(I_v+\Delta I_v)$ 206 to get the Q values 115.

Usually, table-lookup method is used to store the Q values. However, this method requires a large amount of storage memory. Also, if the state space is too large, some system states would be less visited and the convergence of Q-learning rule would take a long time consequently. To tackle the above two problems, the feature extraction method and radial basis function network (RBFN) architecture are applied.

Feature Extraction

Feature extraction is a method that maps the original system state space into some feature vectors associated with it. Feature vectors are used to represent the important characteristics of the system state space. In the WCDMA system, after the RRC decision is made, the change of interference is the most obvious corresponding response. That is, the Q values mainly depend on the resultant interference profile if the state-action pair (x,A(x)) is performed. Therefore, Q(x,A(x)) can be represented as a function of resultant interference profile.

In one preferred embodiment of the present invention. This resultant interference profile of (x,A(x)) is denoted by $(I_m+\Delta I_m, I_v+\Delta I_v)$, where $(I_m, I_v)$ indicates the system loading of existing connections at system state x and $(\Delta I_m, \Delta I_v)$ indicates the change of interference profile due to action A(x). Here a strength-based closed-loop power control is used and assume that the received power for a unit of transmission rate is set to 1. Then $(\Delta I_m, \Delta I_v)$ is obtained by $$(\Delta I_m, \Delta I_v) = \begin{cases} (r_m, r_v), & \text{if accepts a real-time request} \\ (r, 0), & \text{if accepts a non-real-time request with rate } r \\ (0, 0), & \text{if rejects a request} \end{cases} \quad \text{Eq. 14}$$

Now, the system state and action x and A(x) are converted to interference profile $(I_m+\Delta I_m, I_v+\Delta I_v)$.

RBFN Neural Network

The RBFN neural network is a three-layer, self-growing neural network, including an input layer, an output layer, and a hidden layer [14]. The hidden layer consists of a sequence of nodes whose activation functions are normalized Gaussian ones. The key concept of RBFN neural network is local-tuning and separated storage. Each node in the hidden layer represents a part of the characteristics of the input vectors and stores these characteristics locally. Thus, it break a large-dimensional mapping function into multiple small-dimensional functions. Due to the separated storage property, only some parameters of hidden nodes in the RBFN neural network need to be adjusted with respect to the new input error signal, which can reduce the training epoch significantly.

After the procedure of function approximation, the computation of Q values can be easily performed by the virtue of RBFN shown in. FIG. 2. The system state and action x and A(x) are mapped into its corresponding interference profile $(I_m+\Delta I_m, I_v+\Delta I_v)$. The RBFN neural network then calculates Q(x,A) as a function of $(I_m+\Delta I_m, I_v+\Delta I_v)$. The well-known back-propagation (BP) learning rule is applied in the training process.

Moreover, in one preferred embodiment of the present invention, the RBFN neural network further uses an error signal as feedback to obtain the Q values. The Q values for system state x and action A(x) are updated by Eq. 9 when the next incoming request arrives, and $\eta \Delta Q(x,A)$ is served as an error signal which is back-propagated in the RBFN neural network. With the feature extraction method and RBFN neural network, the proposed Q-MRTC can efficiently make an adequate resource allocation through the online operation.

SIMULATION EXAMPLE

Some simulation results using the Q-MRTC scheme are given below.

In one preferred embodiment of the present invention, the WCDMA communication system supporting two types of services: real-time and non-real-time services. Two kinds of traffic are transmitted via the real-time service: one is 2-level transmission rate traffic and the other is M-level transmission rate traffic. They are modeled by 2-level and M-level MMDP (Markov modulated deterministic process), respectively. 2-level MMDP generally is used to formulate ON-OFF voice traffic stream, and the M-level MMDP is to formulate advance speech or other real-time traffic streams, e.g., video.

On the other hand, the non-real-time service is considered to transmit variable-length data bursts. The arrival process of the data burst is Poisson process and the data length is assumed to be with a geometric distribution. A data burst can carry any type of wireless data, e.g., e-mail, WML (wireless markup language) pages, and etc. The detailed traffic parameters are listed in Table 1. A basic rate in the WCDMA system is assumed to be a physical channel with SF=256. For each connection, DPCCH is always active to maintain the connection reliability. To reduce the overhead cost of interference produced by DPCCHs, the transmitting power of a DPCCH is smaller than its respective DPDCH by an amount of 3 dB.

TABLE 1

Traffic parameters in the WCDMA communication system.

| Traffic Type | Traffic Parameter |
|---|---|
| 2-level real-time | Call holding time: 30 seconds |
| | Mean talkspurt duration: 1.00 seconds |
| | Mean silence duration: 1.35 seconds |
| M-level real-time | Call holding time: 30 seconds |
| | Peak rate (M): 4-fold of basic rate |
| | Mean rate: 2-fold of basic rate |
| Non-real-time | Mean data burst size: 200 packets |
| | $r_{min}$: 1-fold of basic rate |
| | $r_{max}$: 8-fold of basic rate |

For evaluation the performance of the Q-MRTC scheme, the conventional interference-based scheme is used as a benchmark. The interference-based scheme would admit the connection for a real-time request or allocate a transmission rate for a non-real-time request if the expected packet error probability in terms of the resultant SIR is smaller than QoS requirement. Here, we consider the QoS requirement of packet error probability, $P_E^*$, is 0.01.

Figure 3:
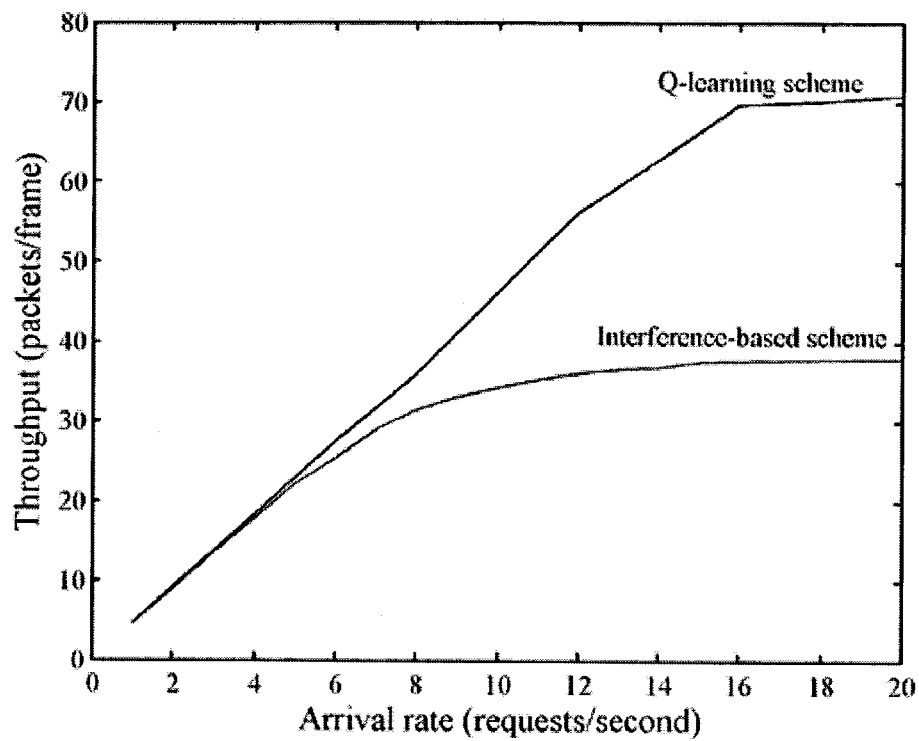
FIG. 3 shows the throughput versus the request arrival rate of Q-MRTC scheme and interference-based scheme.

FIG. 3 illustrates the throughput of the Q-MRTC scheme and the interference-based scheme versus the request arrival rate. The Q-MRTC has higher throughput than the interference-based scheme. As the request arrival rate increases, the throughput improvement becomes larger. Generally speaking, the Q-MRTC scheme can improve the maximum throughput by an amount of 87% over the interference-based scheme. The reason is that the Q-MRTC scheme performs an on-line reinforcement learning algorithm to take the behavior of interference variation into consideration for multi-rate transmission control. That is, the Q-MRTC takes advantage of the multiplexing gain from the variable-rate services. The estimation error of multi-rate transmission cost is reduced once again by on-line reinforcement learning procedure. When traffic load becomes large, the interference level approaches the admission margin. The Q-MRTC provides accurate estimation for multi-rate transmission cost so that the improvement of system throughput becomes large.

On the other hand, the interference-based scheme generally operates in a manner that the multi-rate transmission cost of packet error probability in terms of the resultant interference is estimated at the instant of a request arrival. Actually, some existing connections may terminate or handoff between two consecutive arrivals. The interference decreases consequently. Therefore, the multi-rate transmission cost would be over-estimated in the interference-based scheme.

Figure 4:
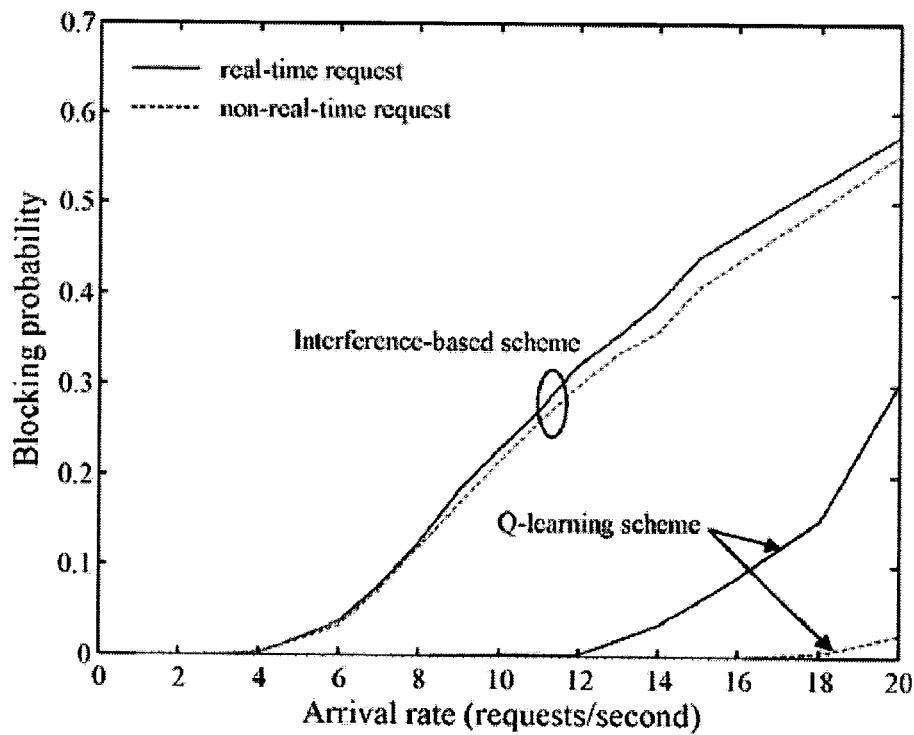
FIG. 4 shows the blocking probability versus the request arrival rate of Q-MRTC scheme and interference-based scheme.

FIG. 4 illustrates the blocking probability versus the request arrival rate of Q-MRTC scheme and interference-based scheme. It is shown that the blocking probability of the interference-based scheme is much larger than that of the Q-MRTC scheme for real-time and non-real-time requests. The blocking probabilities of the real-time requests are higher than those of the non-real-time requests because the admitted transmission rates of the non-real-time requests are negotiable. It can be seen that the Q-MRTC scheme has a larger difference between the two blocking probabilities than the interference-based scheme. The interference-based scheme generally accommodates fewer connections and operates in a lower interference condition so that the interference variation due to the variable-rate transmission behavior of the real-time requests is small. By contrast, the Q-MRTC scheme accommodates more requests and operates in a higher interference situation so that the interference variation produced by the real-time requests becomes critical. That is, the variable-rate transmission behavior contributes a higher admission cost for the Q-MRTC.

Figure 5:
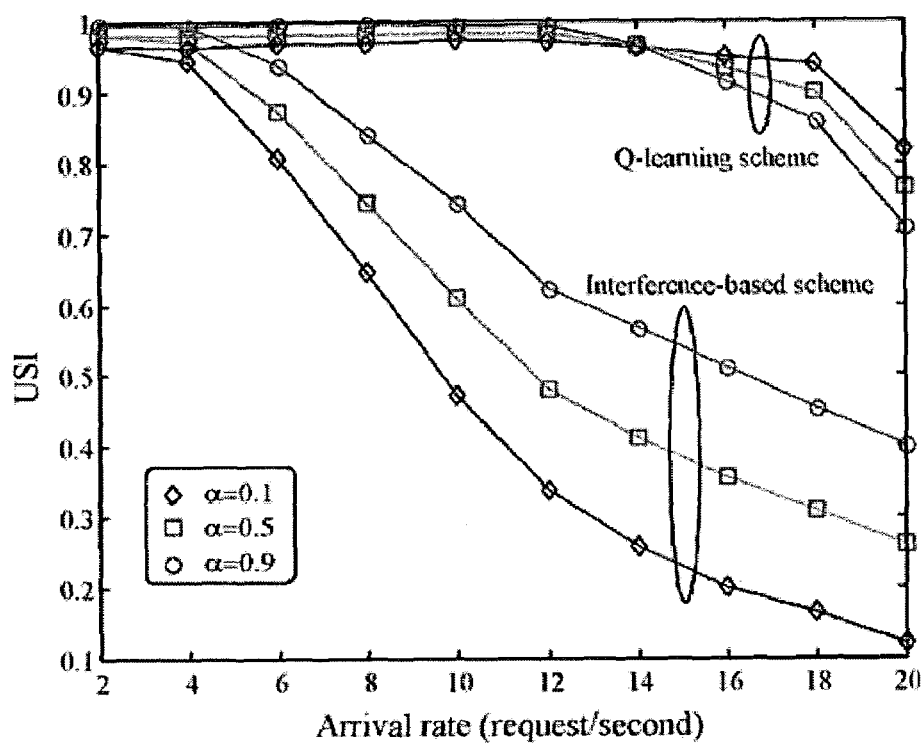
FIG. 5 shows the users' satisfaction index versus the request arrival rate of Q-MRTC scheme and interference-based scheme.

We further define an overall users' satisfaction index (USI) which is a linear combination of $A_{a1}/A_{d1}$ (type-1) and $A_{a2}/A_{d2}$ (type-2), where the $A_{a1}$ ($A_{a2}$) is the admitted transmission rate for type-1(type-2), and the $A_{d1}$ ($A_{d2}$) is the desired transmission rate for type-1 (type-2); $A_{d1}=1$ and $A_{d1}=r_{max}$. That is, USI is expressed as $$USI = \alpha \frac{A_{a1}}{A_{d1}} + (1-\alpha)\frac{A_{a2}}{A_{d2}}$$

where $\alpha$ is the weighting factor. FIG. 5 shows the users' satisfaction index versus the request arrival rate of Q-MRTC scheme and interference-based scheme. FIG. 5 depicts the USI versus the request arrival rate for $\alpha=0.1, 0.5$, and 0.9. It can be found that the Q-MRTC scheme has higher USI than the interference-based scheme, and the improvement is significant as the traffic load becomes heavier. This is because the Q-MRTC scheme can accurately estimate the multi-rate transmission cost. Also, USI decreases as the request arrival rate increases. Since the high traffic load may decrease the admitted transmission rate for new requests, the USI value decreases consequently. Notice that the USI of Q-MRTC scheme decreases faster when $\alpha$ is larger (larger weighting factor for type-1 service) because the Q-MRTC scheme accommodates more requests and operates under higher interference condition than the interference-based scheme does. Thus, the interference variation produced by real-time requests becomes critical.

Figure 6:
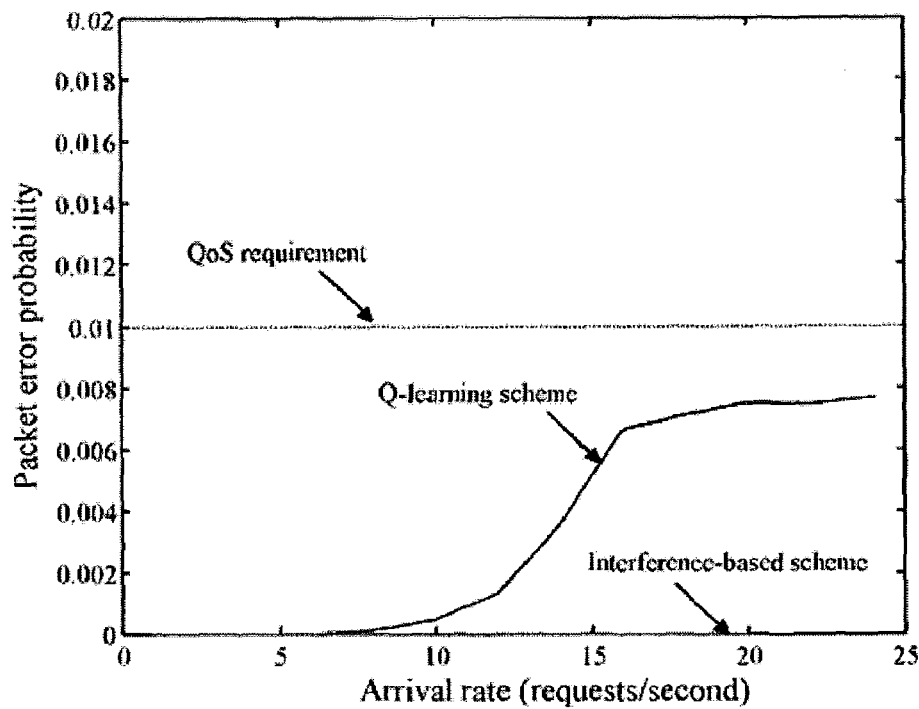
FIG. 6 shows the packet error probability versus the request arrival rate of Q-MRTC scheme and interference-based scheme.

FIG. 6 shows the packet error probability versus the request arrival rate of Q-MRTC scheme and interference-based scheme. It can be seen that the average packet error probability of the Q-MRTC scheme is larger than that of the interference-based scheme, which is almost zero. However, the Q-MRTC scheme can still hold the packet error probability within the QoS requirement. This is because the interference-based scheme performs a over-protection multi-rate transmission control, and only admit less requests and allocate lower transmission rates. On the other hand, the Q-MRTC scheme obtains the transmission cost of packet error probability from the on-line operation of the WCDMA system. Consequently, it can accommodate more requests and allocate appropriately transmission rates as much as possible, under the QoS constraints.

In the foregoing specification the invention has been described with reference to specific exemplar aspects thereof. It will, however, be evident that various modification and changes may be made to thereto without departing from the broader spirit and scope of the invention. The specification and drawings are, accordingly, to be regarded in an illustrative rather than restrictive sense.

What is claimed is:

1. A method for radio resource control (RRC) in the WCDMA system, comprising the following iterative steps:

obtaining a system state x and an action A(x) using an incoming request, a mean of interference $I_m$ and a variance of interference $I_v$;

obtaining Q values based on x and A(x) by using $I_m$, $I_v$, a change of mean $\Delta I_m$ and a change of variance $\Delta I_v$;

allocating an optimal action A*(x) using the Q values; and updating the Q values using a state y and a cost function based on x and A*(x) when a new request with the state y arrives.

2. The method of claim 1, wherein the incoming request is a real-time request.

3. The method of claim 1, wherein the incoming request is a non-real-time request.

4. The method of claim 1, wherein the Q values are obtained by obtaining x and A(x) as a function of $(I_m+\Delta I_m)$ and $(I_v+\Delta I_v)$; and performing back-propagation learning rule to the function of $(I_m+\Delta I_m)$ and $(I_v+\Delta I_v)$.

5. The method of claim 1, wherein the Q values are further obtained by using an error signal as feedback to the Q values.

6. The method of claim 1, wherein the Q values are obtained with the following equations:

$$Q(x, A(x)) = \begin{cases} Q(x, A(x)) + \eta \Delta Q(x, A(x)), & \text{if } (x, a) \text{ is chosen} \\ Q(x, A(x)) & \text{otherwise.} \end{cases}$$

wherein $\eta$ is a learning rate, $0 \leq \eta \leq 1$, and $$\Delta Q(x, A(x)) = \left\{ c(x, A(x)) + \gamma \min_{B(y)} [Q(y, B(y))] \right\} - Q(x, A(x))$$

wherein $c(x,A(x))$ is a cost function, $0 \leq \gamma < 1$ is a discounted factor and $B(y)$ is an optimal action of y.

7. The method of claim 6, wherein the cost function $c(x,A(x))$ is a linear combination of performance measures of state x and $A(x)$, each performance measure representing its corresponding QoS requirements of heterogeneous services.

8. The method of claim 1, wherein the obtaining Q values step further comprising assigning a set of initial Q values.

9. The method of claim 8, wherein the set of initial Q values are log-normally distributed.

10. A method for radio resource control in the WCDMA system, comprising the following iterative steps:
obtaining a system state x and an action $A(x)$ using an incoming request, a mean of interference $I_m$ and a variance of interference $I_v$;
obtaining Q values using x and $A(x)$;
allocating an optimal action $A^*(x)$ using the Q values; and
updating the Q values using a state y and a cost function based on x and $A^*(x)$ when a new request with the state y arrives.

11. The method of claim 10, wherein the incoming request is a real-time request.

12. The method of claim 10, wherein the incoming request is a non-real-time request.

13. The method of claim 10, wherein the Q values are further obtained by using an error signal as feedback to the Q values.

14. The method of claim 1, wherein the Q values are obtained with the following equations:

$$Q(x, A(x)) = \begin{cases} Q(x, A(x)) + \eta \Delta Q(x, A(x)), & \text{if } (x, a) \text{ is chosen} \\ Q(x, A(x)) & \text{otherwise.} \end{cases}$$

wherein $\eta$ is a learning rate, $0 \leq \eta \leq 1$, and $$\Delta Q(x, A(x)) = \left\{ c(x, A(x)) + \gamma \min_{B(y)} [Q(y, B(y))] \right\} - Q(x, A(x))$$

wherein $c(x,A(x))$ is a cost function, $0 \leq \gamma < 1$ is a discounted factor and $B(y)$ is an optimal action of y.

15. The method of claim 14, wherein the cost function $c(x,A(x))$ is a linear combination of performance measures of state x and $A(x)$, each performance measure representing its corresponding QoS requirements of heterogeneous services.

16. The method of claim 10, wherein the obtaining Q values step further comprising assigning a set of initial Q values.

17. The method of claim 16, wherein the set of initial Q values are log-normally distributed.

18. A method for radio resource control in the WCDMA system, comprising the following iterative steps:
obtaining a system state x and an action $A(x)$ using an incoming request, a mean of interference $I_m$ and a variance of interference $I_v$;
obtaining x and $A(x)$ as a function of $Im+\Delta I_m$ and $I_v+\Delta I_v$, wherein $\Delta I_m$ and $\Delta I_v$ representing the change of $I_m$ and $I_v$ respectively;
performing back-propagation learning rule to the function of $I_m+\Delta I_m$ and $I_v+\Delta I_v$;
allocating an optimal action $A^*(x)$ using the Q values; and
updating the Q values using a state y and a cost function based on x and $A^*(x)$ when a new request with the state y arrives.

19. The method of claim 18, wherein the incoming request is a real-time request.

20. The method of claim 18, wherein the incoming request is a non-real-time request.

21. The method of claim 18, wherein the Q values are further obtained by using an error signal as feedback to the Q values.

22. The method of claim 18, wherein the obtaining Q values step further comprising assigning a set of initial Q values.

23. The method of claim 22, wherein the set of Q initial values are log-normally distributed.

24. A circuit for radio resource control in the WCDMA system, comprising:
a state construction circuit for obtaining a system state x and an action $A(x)$ using an incoming request, a mean of interference $I_m$ and a variance of interference $I_v$;
a Q-function computation circuit for obtaining Q values based on x and $A(x)$ by using $I_m$, $I_v$, a change of mean $\Delta I_m$ and a change of variance $\Delta I_v$;
a rate allocation circuit for allocating an optimal action $A^*(x)$ with the Q values; and
a Q-learning rule circuit for updating the Q values using state y and a cost function based on x and $A^*(x)$ when a new request with a state y arrives.

25. The circuit of claim 24, wherein the incoming request is a real-time request.

26. The circuit of claim 24, wherein the incoming request is a non-real-time request.

27. The circuit of claim 24, wherein the Q function computation circuit further comprising:
a resultant interference profile circuit for obtaining x and $A(x)$ as a function of $(I_m+\Delta I_m)$ and $(I_v+\Delta I_v)$; and
a RBFN neural network for performing back-propagation learning rule to the function of $(I_m+\Delta I_m)$ and $(I_v+\Delta I_v)$.

28. The circuit of claim 24, wherein the Q values are further obtained by using an error signal as feedback to the Q values.

29. The circuit of claim 24, wherein the Q values are obtained with the following equations:

$$Q(x, A(x)) = \begin{cases} Q(x, A(x)) + \eta \Delta Q(x, A(x)), & \text{if } (x, a) \text{ is chosen} \\ Q(x, A(x)) & \text{otherwise.} \end{cases}$$

wherein $\eta$ is a learning rate, $0 \leq \eta \leq 1$, and $$\Delta Q(x, A(x)) = \left\{ c(x, A(x)) + \gamma \operatorname*{Min}_{B(y)} [Q(y, B(y))] \right\} - Q(x, A(x))$$

wherein $c(x,A(x))$ is a cost function, $0 \leq \gamma < 1$ is a discounted factor and $B(y)$ is an optimal action of y.

30. The circuit of claim 29, wherein the cost function $c(x,A(x))$ is a linear combination of performance measures of state x and $A(x)$, each performance measure representing its corresponding QoS requirements of heterogeneous services.

31. The circuit of claim 23, wherein the Q-function computation circuit for obtaining Q values further comprising an input for assigning a set of initial Q values.

32. The circuit of claim 31, wherein the set of initial Q values are log-normally distributed.

* * * * *